United States Patent Office 3,505,574
Patented Apr. 7, 1970

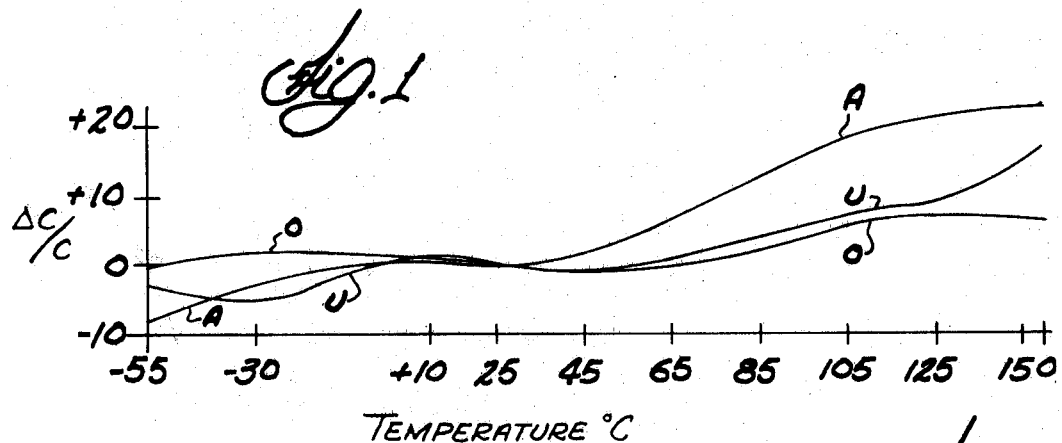
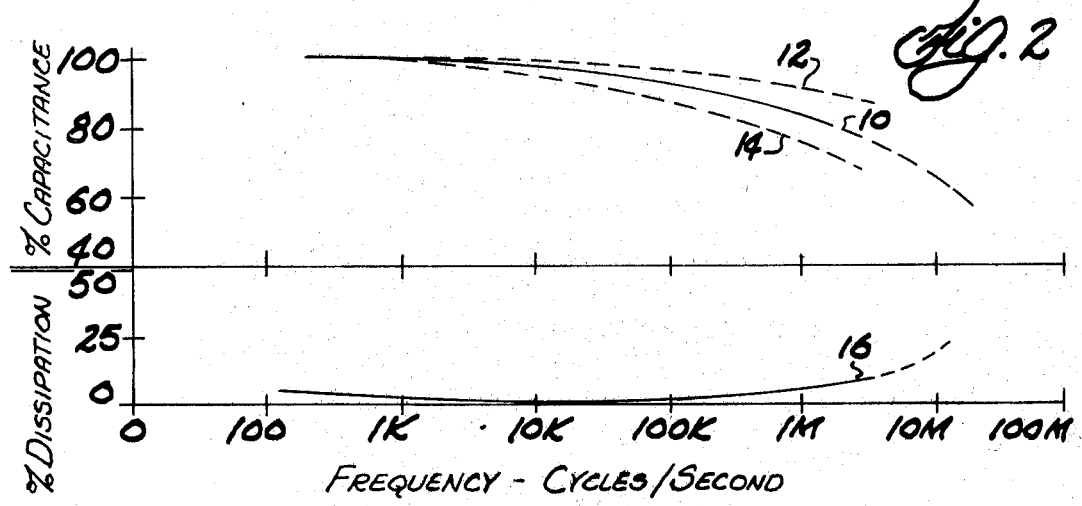
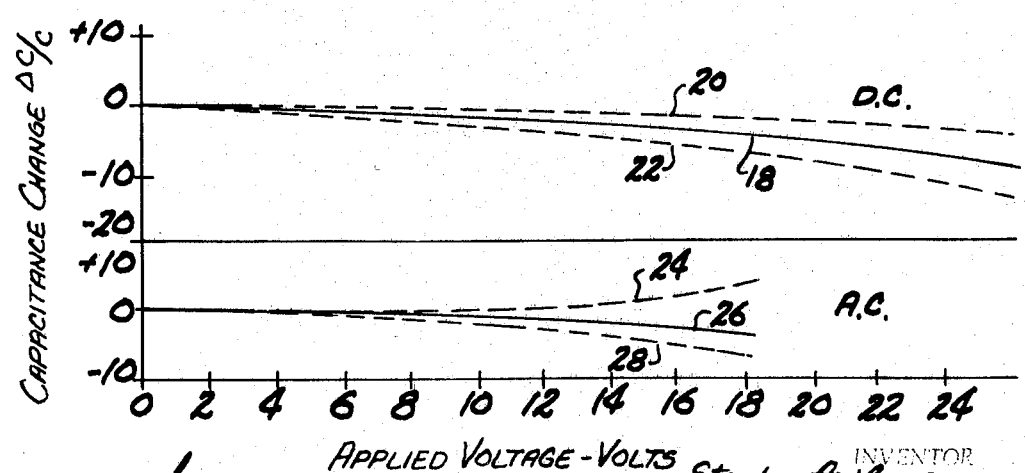

3,505,574
CERAMIC COMPOSITION FOR BARRIER LAYER CAPACITORS
Stanley Arnold Long, Mequon, and Charles Luther Fillmore, Menomonee Falls, Wis., assignors to Globe-Union Inc., Milwaukee, Wis., a corporation of Delaware
Filed July 8, 1966, Ser. No. 563,808
Int. Cl. H01g 9/00; H01l 3/00, 5/00
U.S. Cl. 317—238                18 Claims

ABSTRACT OF THE DISCLOSURE

An electric circuit element is formed having a body of a reduced nonstoichiometric semiconductor material composed of barium titanate with minor amounts of bismuth trioxide, a first material selected from niobium pentoxide, rare earth tinates, rare earth oxides, tantalum pentoxide, and mixtures thereof, and preferably a second material selected from among titanium dioxide, stannic oxide, and zirconium dioxide. Electrodes are secured to the body, at least one electrode being nonohmic.

---

This invention relates to an improved electric circuit element and, more particularly, to an improved barrier layer capacitor.

Barium titanate and solid solutions of various ingredients mixed with barium titanate have been well known for many years as appropriate dielectric bodies for use in the manufacture of various electric circuit elements. High quality, stable capacitors have been made utilizing such barium titanate materials as a conventional dielectric. The history of such structure as well as an improved dielectric body of this type is described more fully in pending United States patent application Ser. No. 490,375, filed Sept. 27, 1965, and assigned to the same assignee as the instant application.

On the other hand, another family of barium titanate capacitors has been developed wherein the barium titanate body is partially reduced to render it semiconductive and thereafter the conductive electrodes are applied in such a manner that an electrical barrier is formed. Such devices provide substantially greater capacitance per unit area, but heretofore it has been assumed that such a capacitor would have degraded stability and exhibit varying characteristics with variations in circuit parameters and environmental conditions or would require unusually pure ingredients and precise control of processing parameters. Dielectric bodies and capacitors of this general type were described in United States Patent No. 2,841,508.

It is a principal object of this invention to provide economical electric circuit elements having high capacitance with enhanced stability under varying circuit and environmental conditions.

It is another object of this invention to provide improved low cost capacitors having stability over a wide range of ambient temperatures with low dissipation, high leakage resistance and stability over a wide range of applied voltages.

It is still another object of this invention to provide an improved method of manufacturing capacitors having relatively high capacitance per unit area with enhanced stability under various environmental conditions and applied parameters from relatively inexpensive ceramic-grade materials.

In one form of this invention a unique combination of ingredients including a major proportion of barium titanate and minor additions of bismuth trioxide and niobium pentoxide are milled together, formed into appropriate discs with an organic binder and then fired through an appropriate sequence including firing to drive off the binder and form the disc, then firing in a reducing atmosphere to render the disc semiconductive, and finally firing silver electrodes upon spaced surfaces of the disc to form the capacitor. Thereafter leads may be soldered or otherwise secured to the electrodes and the capacitor encapsulated in a protective encasement.

For a more complete understanding of the invention, reference will be made to the accompanying drawings wherein:

FIGURE 1 is a chart illustrating the relationship between ambient temperature and capacitance in embodiments typifying three different species of the invention;

FIG. 2 is a chart generally indicating the relationship between the frequency of the applied signal and two capacitor parameters, namely, capacitance and dissipation factor; and FIG. 3 is a chart illustrating the general relationship between the applied voltage, both AC and DC, and the capacitance of typical capacitors made in accordance with this invention.

Electric circuit elements may be made in many forms and configurations while still incorporating the teaching of this invention. In the simplest form the element is a single capacitor comprising a dielectric body and a pair of spaced electrodes. Such a device is illustrated in FIGS. 1 and 2 of U.S. Patent No. 2,841,508. In more complex devices a plurality of electrodes may be formed on a single dielectric body to define a plurality of capacitors and additional elements, such as resistors, may be formed on a surface thereof.

In the preferred embodiment of the invention a dielectric body is formed having as its principal or major ingredient barium titanate ($BaTiO_3$). The principal additional ingredients are bismuth trioxide ($Bi_2O_3$) and niobium pentoxide ($Nb_2O_5$). In the preferred formulation a minor addition of rare earth titanates is also included and the ingredients are combined in the following percentages, by weight.

EXAMPLE A

| | Percent |
|---|---|
| $BaTiO_3$ | 95.0 |
| $Bi_2O_3$ | 3.0 |
| $Nb_2O_5$ | 1.0 |
| RET | 1.0 |

The rare earth titanate may include as its constituents any of the rare earths and in the preferred form is a calcined mixture of various rare earth oxides and titanium dioxide. One useful mixture of rare earth oxides is commonly referred to as didymium oxide and is commercially available. Various mixtures of the rare earth oxides listed in Roup et al. Patent No. 2,520,376 may be used.

The foregoing dielectric body may preferably be processed and formed into a capacitor in the following manner. The raw materials are formed into a batch and wet-milled together for a period of about four hours and the slurry is thereafter dried at about 250° F. The milled and dried ingredients are then powdered and mixed with a small amount of an organic binder, the combination being granulated through a 28 M screen.

The powdered ingredients and binder are then compressed into appropriate shapes for component manufacture. In the described devices the bodies are discs 0.600 inch in diameter and approximately 0.030 inch thick. The discs are buried in zirconia sand and fired in an electric tunnel kiln at 2300 to 2460° F.

The discs thus formed are then reduced by firing in a reducing atmosphere. The time and temperature of the reducing step have substantial bearing on the electrical parameters of the component and are variable to vary capacitance, leakage resistance, temperature coefficient and the like. In certain of the embodiments firing in an atmosphere including 10% $H_2$ for four hours at 2000° F. was found desirable and effective.

Finally the two major surfaces of the body are coated with a silver paint containing appropriate vitreous materials and the silver electrodes are fired onto the body in a kiln at about 1650° F. for approximately thirty minutes. As described in the aforementioned Roup et al. patent, a barrier layer is formed between the semiconductor body and the silver electrodes, this barrier layer being non-ohmic or asymmetric.

The products composed of the ingredients specified in Example A and processed as described above have exhibited the following electrical parameters:

Capacity, 0.30 µf./in.$^2$
Dissipations, 3.1% at 1 kc., 7.0% at 1 mc.
Capacitance change at 1 mc. 12.5% of 1 kc. value
Leakage resistance, 470 megohms at 25 v.

The foregoing characteristics are not attributable to the dielectric body standing alone but to the integral system comprising the dielectric body and fired electrodes. For example, the reduced titanate body alone would exhibit a much lower resistance than the figure for leakage resistance if the measurements are made in such a manner that no electrostatic barrier phenomenon exists. It is believed that the partially reduced body acts as a semiconductor generating an electrostatic barrier adjacent the electrode which is poled negative at any given time. This electrostatic barrier which is extremely thin provides the effective dielectric which produces the apparent high dielectric constant and high leakage resistance.

In addition to the foregoing characteristics, components employing the compositions of this invention processed according to this invention exhibit unusual temperature stability and frequency stability. The variations of capacitance as a percentage of total capacitance for variations in temperature over the range of −55° C. to +150° C. are plotted in FIG. 1. Curve A represents the variations for the product of Example A and shows substantial and significant improvement over barrier layer capacitors heretofore employed.

The variation in capacitance with frequency for typical components constructed in accordance with this invention is illustrated in the upper portion of FIG. 2 where solid line 10 indicates a typical curve while broken lines 12 and 14 illustrates the approximate upper and lower extremes respectively. The lower portion of FIG. 2 illustrates the changes in dissipation with frequency, curve 16 representing a typical characteristic curve.

FIG. 3 relates to the effect on capacitance of variations in applied AC and DC voltages. It is to be expected that the effective capacitance of barrier type capacitors will vary substantially with the applied voltage because of the electrostatic nature of the barrier. However, capacitors constructed of readily available materials and processed in accordance with this invention exhibit surprising and unexpected stability with varying applied voltages. The upper curves in FIG. 3 illustrate the effect on capacitance of variations in DC voltage across the device. Curve 18 is the typical device while broken lines 20 and 22 represent the upper and lower extremes respectively. The lower set of curves 24, 26 and 28 represent the upper extreme, typical and lower extreme variations in capacitance with variations in applied AC voltage.

The foregoing electrical parameters are unusual in barrier type or reduced titanate capacitors and are apparently the result of unique though relatively inexpensive combinations of ingredients processed in a unique sequence of steps.

While one particular example which provides certain desirable characteristics has been described in detail above, it has been found that the improved characteristics described above are attainable in bodies having formulations within certain prescribed ranges. Bodies having formulations including at least one additive from each of the following groups:

GROUP A

| Material: | Weight percent (between about) |
|---|---|
| $Bi_2O_3$ | 2–6 |
| $Bi_2O_3 \cdot 2TiO_2$ | 4–8 |
| $3Bi_2O_3 \cdot 4ZrO_2$ | 3–6 |
| $Bi_2O_3 \cdot SnO_2$ | 4–8 |

GROUP B

| | |
|---|---|
| Mixed rare earth titanates | .1–3 |
| Mixed rare earth oxides | .1–1.5 |
| $Nb_2O_5$ | .1–3 |
| $Ta_2O_5$ | .1–1.5 |
| $La_2O_3$ | .1–1.5 |

In general, it has been discovered that the additives in Group A effect the desirable temperature characteristics which are described above and are illustrated in FIG. 1. It has also been found that the precise stoichiometry set forth in the examples within Group A is not critical. The component materials may be added as oxides in approximately the molecular ratios indicated and similar results will be obtained.

The Group B additives control the kind of semiconductive properties one obtains when the material is reduced and these additives also alter the characteristics of the final device for any given set of process conditions. Increasing Group B additives will produce increased capacitance per unit area and decrease the leakage resistance.

In addition to the additives taken from Groups A and B, a small amount of lead titanate, $PbTiO_3$ may be added and this additive provides additional advantages in the composition. When the lead titanate is added in amounts within the range of about .1 to 4% by weight, the ceramic firing behavior is improved, and a more dense product is formed at lower firing temperatures.

Representative examples of bodies processed in accordance with this invention and comprising formulation within the ranges specified above are expressed in the following table in terms of precentages of total ingredients, by weight.

TABLE I

| Example: | BaTiO₃ | (a) Bi₂O₃<br>(b) Bi₂O₃·2TiO₂<br>(c) Bi₂O₃·3SnO₂ | (a) SnO₂<br>(b) Nb₂O₅ | (a) Ta₂O₅<br>(b) La₂O₃<br>(c) RET | (a) REO<br>(b) PbTiO₃<br>(c) 3Bi₂O₃·4ZrO₂ |
|---|---|---|---|---|---|
| A | 95.0 | 3.0 | | 1.0 | 1.0 |
| B | 95.5 | 3.0 | | 1.0 | 0.5 |
| C | 94.5 | 3.0 | | 1.0 | 1.5 |
| D | 94.0 | 3.0 | | 2.0 | (c) 1.0 |
| E | 94.5 | 3.0 | | 2.0 | 0.5 |
| F | 93.5 | 4.0 | | 2.0 | 0.5 |
| G | 91.5 | 6.0 | | 2.0 | 0.5 |
| H | 92.0 | (a) 6.0 | | 2.0 | |
| I | 91.0 | (a) 6.0 | | 3.0 | |
| J | 97.0 | 2.0 | | 1.0 | |
| K | 96.0 | 3.0 | | 1.0 | |
| L | 95.0 | 4.0 | | 1.0 | |
| M | 93.0 | 6.0 | (b) 1.0 | | |
| N | 95.0 | 3.0 | | 2.0 | |
| O | 94.0 | 3.0 | | 3.0 | |
| P | 95.0 | 4.0 | | 1.0 | |
| Q | 93.0 | 6.0 | | 1.0 | |
| R | 91.0 | 8.0 | | 1.0 | |
| S | 93.5 | (b) 6.0 | | 0.5 | |
| T | 92.0 | (b) 6.0 | | 2.0 | |
| U | 91.0 | 6.0 | | 3.0 | |
| V | 90.0 | 8.0 | | 2.0 | |
| W | 89.0 | 8.0 | | 3.0 | |
| X | 93.5 | (a) 4.0 | | 0.5 | |
| Y | 91.0 | 8.0 | | | 2.0 |
| Z | 91.0 | (c) 6.0 | | (c) 1.0 | |
| AA | 90.5 | 6.0 | | 1.5 | |
| BB | 91.5 | 3.0 | 3.0 | (a) 0.5 | (b) 2.0 |
| CC | 91.0 | 3.0 | 3.0 | (b) 1.0 | 2.0 |
| DD | 90.5 | 3.0 | 3.0 | (b) 1.5 | 2.0 |
| EE | 91.0 | 3.0 | 3.0 | | (a) 1.0 |
| FF | 90.5 | (a) 3.0 | (a) 3.0 | | (a) 1.0 |
| GG | 93.5 | 3.0 | 1.5 | 2.0 | |
| HH | 91.5 | 3.0 | 1.5 | 2.0 | 2.0 |
| II | 87.5 | 3.0 | 4.5 | 1.0 | 4.0 |
| JJ | 90.5 | 3.0 | 1.5 | (c) 1.0 | (b) 4.0 |
| KK | 93.0 | 3.0 | (b) 1.0 | 1.0 | 2.0 |
| LL | 90.0 | 4.0 | | 2.0 | 4.0 |
| MM | 94.0 | (c) 4.0 | | 2.0 | |
| NN | 91.0 | 4.0 | | 1.0 | 4.0 |
| OO | 93.0 | | (b) 1.0 | | (c) 6.0 |
| PP | 93.0 | (b) 3.0 | (b) 1.0 | | (c) 3.0 |

The electrical properties of the foregoing examples of the invention are similar to Example A and these are tabulated in the following table wherein: Column I lists the examples; Column II lists the capacity in μf./in.²; Column III lists the precentage dissipation at one kilocycle; Column IV indicates the percentage dissipation at one megacycle; Column V lists the capacitance decrease at one megacycle as a percentage of the capacitance of the same body at one kilocycle, ΔC/C; Column VI lists the leakage resistance and the voltage at which it was measured; and Column VII lists the maximum variation in capacitance, in percent of the 25° C. value of capacitance, for ambient temperatures from −55 to +150° C.

TABLE II

| I | II | III | IV | V | VI | VII |
|---|---|---|---|---|---|---|
| A | 0.30 | 3.1 | 5.4 | 12.5 | 470 M (25 v.) | 21.7 |
| B | 0.22 | 3.0 | 4.7 | 11.3 | 685 M (25 v.) | 23.4 |
| C | 0.37 | 3.0 | 7.0 | 13.5 | 85 M (25 v.) | 16.3 |
| D | 0.29 | 4.0 | 18.6 | 18.3 | 252 K (20 v.) | 10.2 |
| E | 0.32 | 4.6 | 14.4 | 18.1 | 20 M (10 v.) | 20.9 |
| F | 0.28 | 4.3 | 17.3 | 19.2 | 20 M (10 v.) | 16.4 |
| G | 0.23 | 4.3 | 25.1 | 25.8 | 3M (15 v.) | 23.3 |
| H | 0.21 | 4.4 | 20.0 | 21.7 | 5M (25 v.) | 22.6 |
| I | 0.24 | 4.0 | 5.5 | 9.9 | 6M (15 v.) | 13.4 |
| J | 0.19 | 5.0 | 13.0 | 19.7 | 50 M (25 v.) | 31.1 |
| K | 0.20 | 3.7 | 9.5 | 12.8 | 400 M (25 v.) | 41.1 |
| L | 0.20 | 4.0 | 9.4 | 13.0 | 300 M (25 v.) | 28.7 |
| M | 0.25 | 3.1 | 6.0 | 8.5 | 550 M (25 v.) | 22.0 |
| N | 0.29 | 4.6 | 7.0 | 10.0 | 8 M (15 v.) | 19.2 |
| O | 0.25 | 4.0 | 6.2 | 9.1 | 10 M (10 v.) | 6.5 |
| P | 0.32 | 5.1 | 5.4 | 14.8 | 2.2 M (15 v.) | 36.3 |
| Q | 0.34 | 4.5 | 6.6 | 16.0 | 300 K (15 v.) | 37.9 |
| R | 0.30 | 4.6 | 10.7 | 17.8 | 2.9 M (15 v.) | 38.2 |
| S | 0.37 | 4.6 | 7.4 | 20.1 | 2.0 M (15 v.) | 53.1 |
| T | 0.27 | 4.7 | 11.2 | 20.4 | 1.4 M (12 v.) | 32.9 |
| U | 0.25 | 4.9 | 19.7 | 20.3 | 20 M (10 v.) | 16.3 |
| V | 0.27 | 4.9 | 16.8 | 23.7 | 5 M (12 v.) | 26.2 |
| W | 0.24 | 4.8 | 35.2 | 31.9 | 20 M (10 v.) | 23.8 |
| X | 0.21 | 3.1 | | | 3,000 M (25 v.) | |
| Y | 0.26 | 2.6 | | | 4,600 M (25 v.) | |
| Z | 0.28 | 3.6 | | | 325 M (25 v.) | |
| AA | 0.30 | 4.4 | | | 6 M (25 v.) | |
| BB | 0.35 | 3.4 | | | 330 M (25 v.) | |
| CC | 0.38 | 4.4 | | | 640 M (25 v.) | |
| DD | 0.37 | 4.3 | | | 80 M (25 v.) | |
| EE | 0.24 | 3.6 | | | 1,400 M (25 v.) | |
| FF | 0.53 | 5.7 | | | 0.5 M (15 v.) | |
| GG | 0.30 | 6.4 | | | 240 M (25 v.) | |
| HH | 0.31 | 4.1 | | | 78 M (25 v.) | |
| II | 0.31 | 3.5 | | | 170 M (25 v.) | |

TABLE II—Continued

| I | II | III | IV | V | VI | VII |
|---|---|---|---|---|---|---|
| JJ | 0.24 | 4.4 | | | 340 M (25 v.) | |
| KK | 0.33 | 2.4 | | | 1,300 M (25 v.) | |
| LL | 0.50 | 3.5 | | | 0.3 M (15 v.) | |
| MM | 0.43 | 5.1 | | | 3.4 M (15 v.) | |
| NN | 0.23 | 3.4 | | | 355 M (25 v.) | |
| OO | 0.34 | 3.7 | | | 5 M (25 v.) | |
| PP | 0.33 | 4.1 | | | 7 M (25 v.) | |

While the temperature characteristics for each of the foregoing examples are not set forth completely, curve O in FIG. 1 illustrates the variations in capacitance with temperature for Example O which contains no rare earth oxides, and curve U represents the characteristics of Example U which includes titanium dioxide, $TiO_2$.

Commercially available mixtures of rare earth oxides combined with titanates produce the desired effects and may includes titanates of the so-called rare earths having atomic numbers between 57 and 71. The principal rare earths employed are lanthanum and neodymium.

In addition to the silver electrodes described above, electrodes may be formed of other metals such as platinum or zinc although silver is preferred.

Without further elaboration, the foregoing will so fully explain the character of the invention that other may by applying current knowledge, readily adapt the same for use under varying conditions of service, while retaing certain features which may properly be said to constitute the essential items of novelty involved, which items are intended to be dfined and secured by the following claims.

What is claimed is:

1. An electric circuit element comprising a body of a ceramic dielectric material which has been partially reduced to render said body semiconductor, and conducting electrodes secured thereto at least one of which is in asymmetric barrier-forming relationship therewith, said partially reduced material comprising nonstoichiometric semiconductive material, said semiconductive material being composed of barium titanate with a minor amount of bismuth trioxide and a minor amount of a material selected from a first group of compounds consisting of niobium pentoxide, rare earth titanates, rare earth oxides, tantalum pentoxide and mixtures thereof.

2. The electric circuit element of claim 1 wherein said first group compound is niobium pentoxide.

3. The electric circuit element of claim 1 wherein said first group compound is a rare earth titanate.

4. The electric circuit element of claim 1 wherein said first group compound is a rare earth oxide.

5. The electric circuit element of claim 1 wherein said first group compound is tantalum pentoxide.

6. The electric circuit element of claim 1 wherein said bismuth trioxide is present in an amount of between 2% and about 6% by weight of said body and said first group compound is present in an amount of between about 0.1% and 3% by weight of said body.

7. The electric circuit element of claim 1 wherein said bismuth trioxide comprises about 3% by weight of said body and said niobium pentoxide comprises about 3% by weight of said body.

8. The electric circuit element of claim 1 wherein said first group compound is lanthanum trioxide which is present in an amount of between about 0.1% and about 1.5% by weight of said body.

9. The electric circuit element of claim 1 wherein said semiconductive body material further includes a minor amount of a compound taken from the second group consisting of titanium dioxide, stannic oxide and zirconium dioxide.

10. The electric circuit element of claim 9 wherein said bismuth trioxide and said second group compound are present in the combined amount of between about 3% and about 8% by weight of said body and said first group compound is present in an amount of between about 0.1% and 3% by weight of said body.

11. The electric circuit element of claim 9 wherein said second group compound is titanium dioxide and is present in an amount sufficient to form $Bi_2O_3 \cdot 2TiO_2$ with said bismuth trioxide.

12. The electric circuit element of claim 11 wherein said $Bi_2O_3 \cdot 2TiO_2$ comprises between about 4% and about 8% by weight of said body and said first group compound is niobium pentoxide and is present in an amount of between about 0.1% and about 3% by weight of said body.

13. The electric circuit element of claim 11 wherein said $Bi_2O_3 \cdot 2TiO_2$ comprises about 6% by weight of said body and said niobium pentoxide comprises about 3% by weight of said body.

14. The electric circuit element of claim 1 including a minor amount of lead titanate.

15. The electric circuit element of claim 14 wherein said lead titanate comprises between about .1% and about 4% by weight of said body.

16. The electric circuit element of claim 1 wherein said bismuth trioxide is present in an amount of between about 2% and about 6% by weight of said body and said material of said first group of compounds is a mixture of niobium pentoxide and rare earth titanates, said niobium pentoxide being present in an amount of between about 0.1% and about 3% by weight of said body and said rare earth titanates being present in an amount of between about 0.1% and about 3% by weight of said body.

17. The electric circuit element of claim 16 wherein said bismuth trioxide comprises about 3% by weight of said body, said niobium pentoxide comprises about 1% by weight of said body and said rare earth titanates comprise about 1% by weight of said body.

18. The electric circuit element of claim 16 wherein said semiconductive body material further includes lead titanate in an amount of between about 0.1% and about 4% by weight of said body.

References Cited

UNITED STATES PATENTS

| | | | |
|---|---|---|---|
| 3,080,239 | 3/1963 | Zlatnick | 317—258 |
| 3,268,783 | 8/1966 | Saburi | 317—237 |
| 3,292,062 | 12/1966 | Gallagher et al. | 317—238 |
| 3,345,188 | 10/1967 | Honma | 317—258 |
| 3,410,705 | 11/1968 | Honma | 317—258 |

JAMES D. KALLAM, Primary Examiner

U.S. Cl. X.R.

317—234, 230